(12) United States Patent
Eswaran et al.

(10) Patent No.: US 8,474,041 B2
(45) Date of Patent: Jun. 25, 2013

(54) AUTONOMOUS DIAGNOSIS AND MITIGATION OF NETWORK ANOMALIES

(75) Inventors: Anand Eswaran, Bangalore (IN); Chivukula Koundinya, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 487 days.

(21) Appl. No.: 12/765,772

(22) Filed: Apr. 22, 2010

(65) Prior Publication Data

US 2010/0275262 A1 Oct. 28, 2010

(30) Foreign Application Priority Data

Apr. 22, 2009 (IN) .............................. 928/CHE/2009

(51) Int. Cl.
*G06F 11/00* (2006.01)
(52) U.S. Cl.
USPC ................................ 726/22; 726/23; 713/167
(58) Field of Classification Search
USPC ............................................ 726/23; 713/167
See application file for complete search history.

(56) References Cited

U.S. PATENT DOCUMENTS

| 2006/0085854 | A1* | 4/2006 | Agrawal et al. | 726/23 |
| 2007/0239984 | A1* | 10/2007 | Lang | 713/167 |
| 2010/0071061 | A1* | 3/2010 | Crovella et al. | 726/23 |

FOREIGN PATENT DOCUMENTS

IN 928/CHE/2009 4/2009

\* cited by examiner

*Primary Examiner* — Nathan Flynn
*Assistant Examiner* — Phuoc Tran

(57) ABSTRACT

Autonomous diagnosis and mitigation of network anomalies may include creating a plurality of sketch matrices wherein each sketch matrix corresponds to an individual hashing function and each row in each sketch matrix corresponds to an array of hashed parameters of interest from multiple network devices for a given period of time, the parameters of interest being configurable by an administrator. A principal components analysis (PCA) input matrix is created for each of the sketch matrices by computing an entropy value for each element in the sketch matrices, and principal components analysis (PCA) is performed on each of the PCA input matrices to heuristically detect a network anomaly in real time.

20 Claims, 4 Drawing Sheets

AUTONOMOUS DIAGNOSIS AND MITIGATION OF NETWORK ANOMALIES

BACKGROUND

Network administration in core enterprise settings is no easy task. Today's network administrators face many challenges. For example, network administrators generally must protect their networks by identifying and securing networks from various sophisticated security attacks (e.g., distributed denial of service attacks, worms, port scans, etc.) and dynamically responding to these events. Network administrators are also often in charge of constantly monitoring network dynamics to be able to analyze the impact of changes in traffic patterns/configurations for network optimization and diagnosing protocol-level configuration problems. Additionally, in some cases network administrators need to extract as much operational/business intelligence out of a network to generate reports that allow for educated decisions with regard to upgrades, feature modifications, and optimizations in the network.

These problems are complicated severely by the scalability requirements associated with core networks having up to a several hundred routers and the high data rates at which data may be transferred through large networks (e.g., 40 Gb/s under OC-768).

BRIEF DESCRIPTION OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

In some cases, it may be desirable to diagnose and defend against network anomalies in real-time by actively monitoring a wide range of specific administrator-configurable network parameters on an enterprise network scale and quickly localizing problematic parameters.

In light of this and other goals, the present specification discloses systems and methods of network administration wherein a network management station utilizes the principles of sketching and principal component analysis (PCA) to actively monitor a plurality of network parameters selected by an administrator and mathematically identify network anomalies in the parameters and identify the root-cause responsible for the anomalies detected.

As used in the present specification and in the appended claims, the term "principal components analysis" refers to a mathematical procedure that utilizes an eigenvalue decomposition or singular value decomposition of a data matrix to detect variability in the data of the matrix.

As used in the present specification and in the appended claims, the term "sketching" refers to a process relying on random projections of data to isolate anomalies in the data.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

The principles disclosed herein will now be discussed with respect to illustrative systems and methods of network administration.

Illustrative Systems

Figure 1:
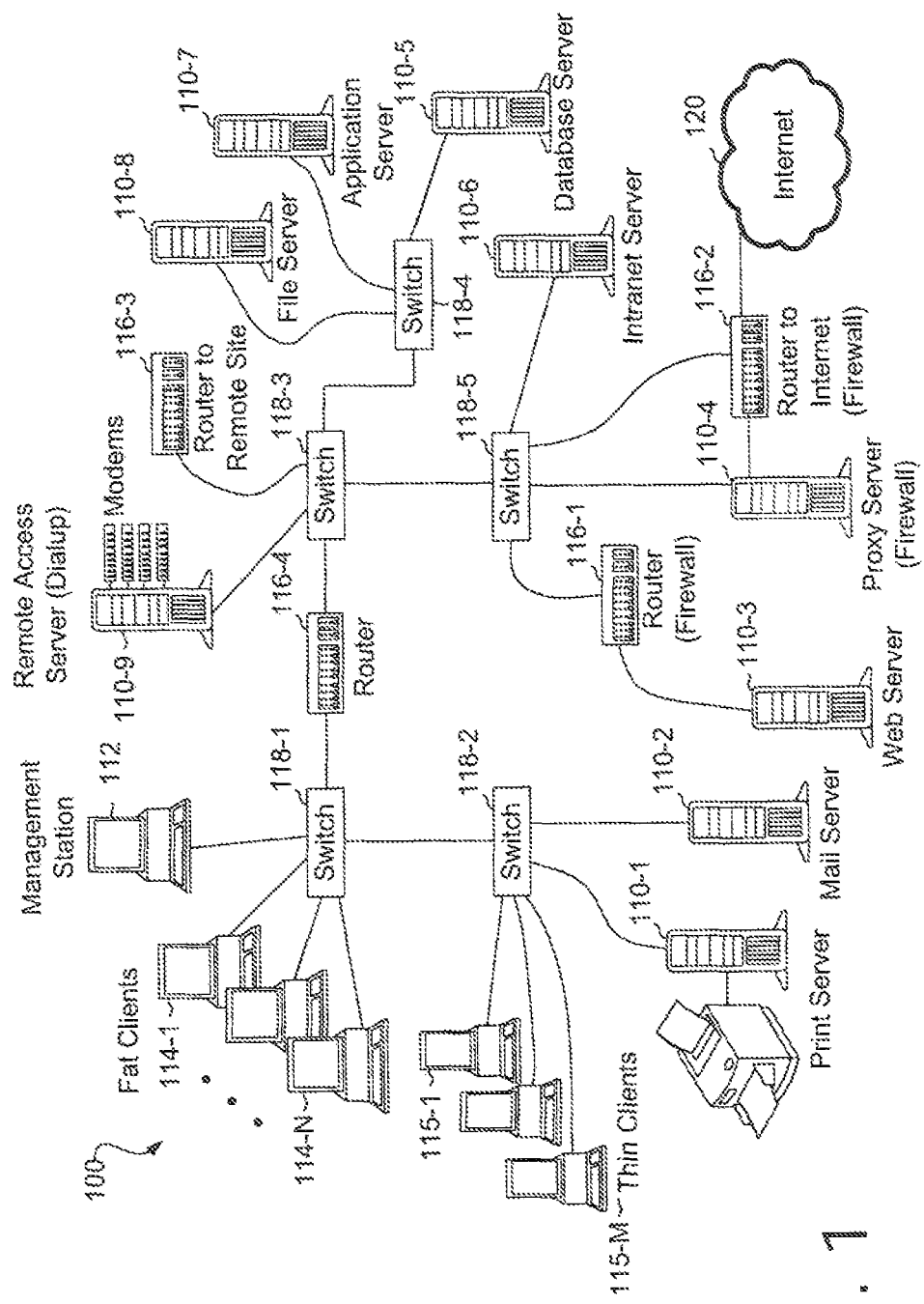
FIG. 1 is a block diagram of an illustrative network according to one exemplary embodiment of the principles described herein.

FIG. 1 is a block diagram of an illustrative computing device network (100), such as a large-scale network used by a company. As shown in FIG. 1, a number devices can be networked together via a LAN and/or WAN via router, hubs, switches and the like. The embodiment of FIG. 1 illustrates clients and servers in a LAN. However, embodiments of the disclosure are not so limited. The embodiment shows one server for each type of service on a LAN. However, in practice several functions can be combined in one device or machine and, for large volumes, multiple devices or machines can be used to balance the traffic for the same service. For example, an enterprise system or network can include a collection of servers, or server farm, cooperating to provide services to the network.

Specifically, FIG. 1 illustrates a print server (110-1) to handle print jobs for the network (100), a mail server (110-2), a web server (110-3), a proxy server (firewall), a database server (110-5), an intranet server (110-6), an application server (110-7), a file server (110-8), and a remote access server (dial up) (110-9). Again, the examples provided here do not provide an exhaustive list of possible servers in the network (100). The network of FIG. 1 further illustrates a network management station (112), e.g., a PC or workstation, a number of "fat" clients (114-1 to 114-N) which can also include PCs and workstations and/or laptops, and a number of "thin" clients (115-1 to 115-M) which can include terminals and/or peripherals such as scanners, facsimile devices, handheld multifunction device, and the like. The designators "N" and "M" are used to indicate that a number of fat or thin clients can be attached to the network 100. The number that N represents can be the same or different from the number represented by M. In the network (100) of FIG. 1, all of these exemplary network devices may be connected to one another and/or to other networks via routers, (116-1, to 116-4), and hubs and/or switches (118-1 to 118-5), as the same are known and understood by one of ordinary skill in the art. Embodiments of the present specification, however, are not limited to the number and/or quantity of network devices in FIG. 1's illustration.

As one of ordinary skill in the art will appreciate, many of these devices include one or more processors and memory hardware. For example, the network management station (112) may include a processor and memory as the same are well know to one of ordinary skill in the art. Embodiments of the disclosure are not limited, for the various devices in the network, to the number, type or size of processor and memory resources.

Computer programs (e.g., computer usable program code), as described in more detail below, may be embodied within the memory hardware of the network management station (112). For example, a computer program can be resident on the network (100) in the memory of the network management station (112), and executable by the processor thereon. Additionally or alternatively, the computer program embodiments may be resident elsewhere in the network (100) such as in memory hardware of one or more network devices in communication with the network management station (112).

It will be readily apparent that the embodiments described can be performed by application specific integrated circuit (ASIC) logic, computer executable instructions operable on the systems and devices shown herein, and/or combinations thereof. The present specification, however, is not limited to any particular operating environment or to software written in a particular programming language. Software, application modules and/or computer executable instructions, suitable for carrying out embodiments of the present specification, can be resident in one or more devices or locations or in several devices and location in a network.

Figure 2:
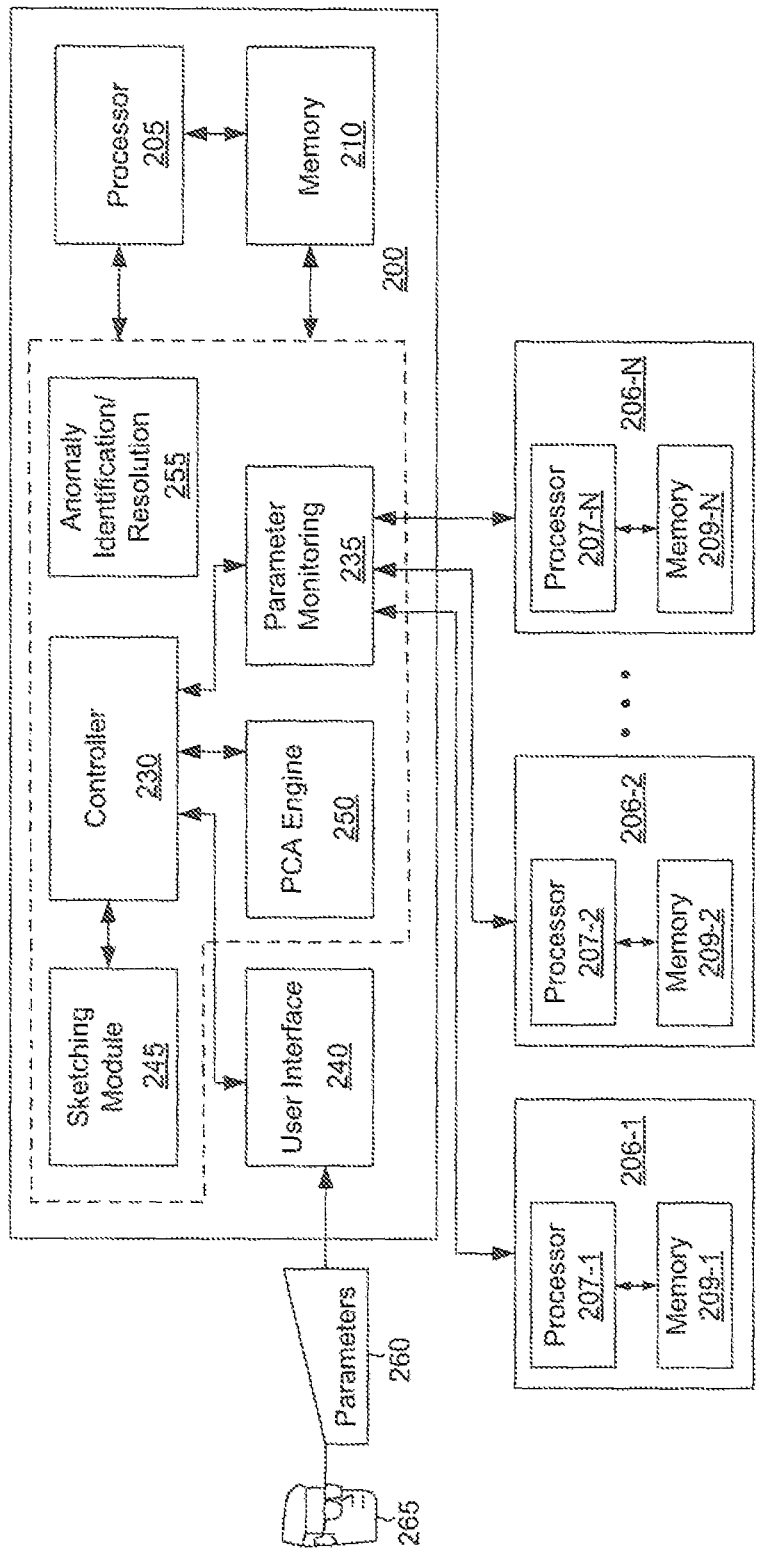
FIG. 2 is a block diagram of an illustrative network management station in a core network according to one exemplary embodiment of the principles described herein.

FIG. 2 shows a block diagram of an illustrative network management device (200) analogous to the network management station (112, FIG. 1) described previously. The network management device (200) includes a processor (205) and memory (210) that can be used to store and execute computer executable instructions associated with embodiments of the present specification. As illustrated, the network management device (200) may be in communication with a number of network devices (206-1 to 206-N), connected thereto over a network such as the network (100, FIG. 1) shown in FIG. 1. The network devices (206-1 to 206-N) may be network routers (116-1 to 116-4, FIG. 1), switches (118-1 to 118-5, FIG. 1), servers (110-1 to 110-9, FIG. 1), other network devices, and/or combinations thereof. Accordingly, each network device may include a processor (207-1 to 207-N), and memory (209-1 to 209-N), among other components.

The processor (205) and computer readable instructions embodied within the memory (210) of the network management device (200) may together implement various modules (230, 235, 240, 245, 250, 255) that interact with each other as shown in FIG. 2. A controller module (230) may be communicatively coupled to and coordinate the activities and transfer of information among each of the remaining modules (235, 240, 245, 250, 255).

In the example embodiment shown in FIG. 2A, the network devices (206-1 to 206-N) can be connected to the network management device (200), as discussed herein, through a parameter monitoring module (235) such that the network management device (200) can receive information associated with measured parameters (260) of interest from the various network devices (206-1 to 206-N) connected thereto. The parameters (260) of interest may be determined by a human administrator (265) through a user interface module (240) and monitored accordingly through the parameter monitoring module (235). As will be explained in more detail below, examples of parameters (260) of interest in the network management device (200) may include, but are not limited to, link-counts, origin-destination traffic volumes, internet protocol (IP) header distributions, OSPF protocol advertisements and BGP protocol updates.

One of ordinary skill in the art will appreciate the manner in which computer executable instructions can be executed in conjunction with a network management program, which employs a protocol such as SNMP, ICMP, etc., to collect response information from the various network devices (206-1 to 206-N) corresponding to the parameters (260) of interest. Alternatively, the parameter monitoring module (235) may simply observe the parameters (260) of interest in the network traffic of the network devices (206-1 to 206-N) without necessarily directly requesting the parameters (260) of interest from the network devices (206-1 to 206-N).

The monitored parameters (260) from the parameter monitoring module (235) may be hashed into one or more sketch matrices by a sketching module (245), as will be explained in more detail below, and passed to a principal components analysis (PCA) engine module (250) that, as will also be explained in more detail below can be viewed as a network-wide filtering mechanism that enables identification of network aberrations or anomalies in the parameters (260) of interest. The cause of these anomalies may be determined by an anomaly identification/resolution module (255), which may also be configured to automatically take action to mitigate the cause of the anomaly:

The PCA engine module (250) may analyze matrices of the parameter (260) of interest measured over time where the parameter (260) of interest in PCA-amenable.

For example, given that the spatial-temporal characteristics of a network may be captured using a matrix formulation A where the columns of the matrix represent some spatial parameter of interest (e.g. each column $a_i$ represents a link or network device (206-1 to 206-N)) and the rows represent a temporal parameter of interest (e.g., each row $a_j$ represents the link counts of each network device (206-1 to 206-N) measured in a 5-minute "time bin"), it can be observed that the singular values (i.e., roots of eigenvalues) of the eigen-transform of A, when sorted in decreasing order, is observed to have the shape of the hyperbolic function with a deep knee. This shape implies "low dimensionality," in other words, that the "energy" underlying the matrix A can be captured in a minimal number of dominant vector projections. This property in turn allows matrix A to be rewritten as:

$$A = A_{normal} + A_{anomaly}$$

where $A_{anomaly}$ captures the lower non-principal dimensions of interest while $A_{normal}$ captures the dominant components in A.

In particular, each row a of A can be expressed as the sum of $a_{normal} = PP^T a$ and $a_{anomaly} = (I-PP^T)a$ where $P=[v_1, v_2, \ldots, v_k]$ includes the k principal components of A. Thus, a volume anomaly results in a large change of $[a_{anomaly}]$, which is defined as the square prediction error (SPE). Accordingly, by checking that the SPE is greater than a threshold statistic (equal to the popular $Q_{statistic}$ test in statistics), network anomalies may be identified.

Figure 3:
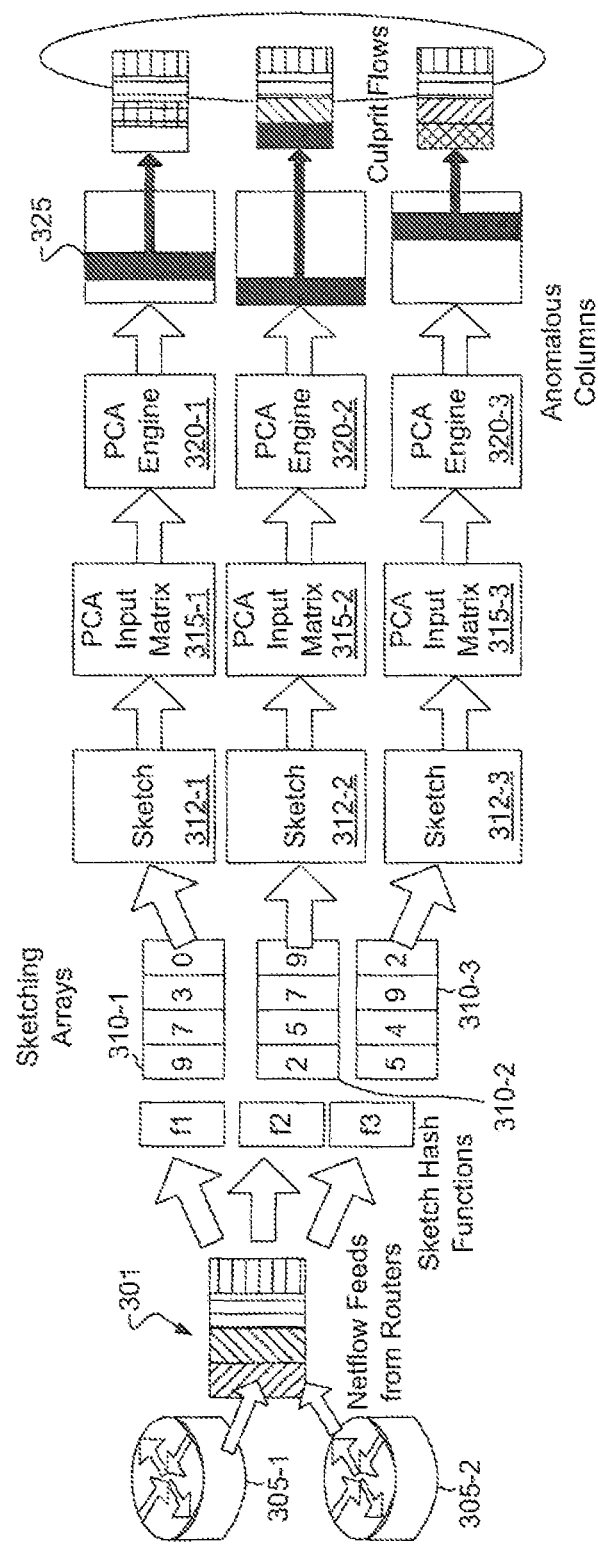
FIG. 3 is a diagram of an illustrative process of anomaly diagnosis in a core network according to one exemplary embodiment of the principles described herein.

This general technique is called the subspace projection method. While in the above example the rows of A represented link-counts, many other parameters (260) of interest may utilize subspace projection to identify various types of network anomalies. For example, as shown in FIG. 3, the rows of A could represent the parameter (260) of origin-destination pair traffic volumes, as reconstructed from Netflow records captured from the ingress/egress routers at the edge of the network backbone, and the columns of A could represent time-bins to identify origin-destination pair volume anomalies.

Alternatively, each row in A could represent the entropy in the distribution of source/destination IP addresses or source/destination ports for a particular origin-destination pair. In such embodiments, a network with p origin-destination pairs, given that we are interested in the distributional properties of 4 parameters (source/destination IP addresses/ports) gives rise to a row of length 4p. Each row represents entropy values measured over particular time-bin intervals. This type of embodiment may be particularly useful for tracking distribution anomalies such as port scans, worm attacks, and botnet attacks.

In other embodiments directed to Border Gate Protocol ("BGP")/Open Shortest Path First ("OSPF") protocol troubleshooting, columns may correspond to particular external BGP neighbors (according to link-state advertisements generated by an OSPF router) an d rows may denote time. Thus, each matrix element denotes the number of routes in an autonomous system that were received from a particular external BGP neighbor (OSPF router) in a particular time-bin. Anomalous columns would therefore denote unstable EBGP neighbors (unstable OSPF routers in the local autonomous system).

Additional embodiments may also analyze switching/application protocol or any other parameter (260) of interest that is determined to be PCA-amenable. PCA is highly robust and the present specification harnesses the ability of PCA to function as a work-horse engine that can be generally applied for monitoring a wide spectrum of network parameters across various dimension of network health, limited only by the creativity of the network administrator (265). Advantageously, by inputting the parameter (260) of interest to the PCA engine module (250) in the form of a matrix, a whole-network macroscopic analysis of anomaly detection and network health may be made.

Referring now to FIG. 3, a diagram is shown of an anomaly identification process using sub-space sketching and PCA analysis to leverage PCA for network-wide anomaly diagnosis and troubleshooting. This process may be performed, for example, by the sketching module (245, FIG. 2), the PCA engine (250, FIG. 2), and the anomaly identification/resolution module (255, FIG. 2) described above.

In most scenarios of network monitoring, abnormal changes in the distribution of the network parameter counts over time indicate problems. In such scenarios, sketching may be used to extract the signature of responsible for the error or anomaly. Such signatures may include, but are not limited to, the 5-tuple flow signatures of deviant flows, the identification of an OSPF router responsible for triggering routing policy rerun, and/or the BGP neighbor responsible for unstable BGP peering.

Sketching is a technique based on random projections that is used to quickly identify anomaly signatures. Sketching assumes as input an array of parameters (301) of interest where each parameter is defined by a (key, val) pair. For example, where the parameters (301) are derived from Netflow Feeds of a source router (305-1) and a destination router (305-2), a (key, val) pair may include an IP-header field (key) and a number (val) of bytes or packets corresponding to that record within a given time-bin.

In alternative embodiments, if a network management station is configured to identify anomalous OSPF LSA activity, a key may be the OSPF identifier of the source of the LSA while the value is simply 1. Similarly, where the network management station is configured to monitor the stability of an EBGP peering session, keys may be the EBGP neighbor router identifiers while the values are the number of routes received from that particular neighbor.

In the present example, an array (301) of four parameters collected from netflow feeds for a source and destination router (305-1, 305-2) during a given time-bin serves as the input to four parallel sketching hash functions (f1, f2, f3). Each hash function (f1, f2, f3) produces a corresponding sketching array (310-1, 310-2, 310-3, respectively) having the same number of elements as the array (301) of parameters (in this case, four). Each element in the sketching arrays (310-1, 310-2, 310-3) has a two components—a counter and a pointer. The counter stores the hashed key of one of the original parameters in the parameter array (301) and the pointer points to a linked list that stores the original (key, val) pair of the corresponding element in the parameter array (301). Each sketching array (310-1, 310-2, 310-3) may become a row in a sketch matrix (312-1, 312-2, 313-2) corresponding to the hash function (f1, f2, f3) used to create the sketching array (310-1, 310-2, 310-3).

The entropy value is then calculated for each counter element j in each sketching array i (310-1, 310-2, 310-3) of the sketching matrices (312-1, 312-2, 312-3) using the formula:

$$E_i[j] \leftarrow p[i][j] \log(p[i][j])$$

where $p[i][j]=a_i[j]/\Sigma_k a_i[k]$, k being the number of sketching matrices (312-1, 312-2, 312-3) which is the same as the number of hash functions (f1, f2, f3). Thus, $E_i[j](t)$ denotes entropy counts of a sketch element at column i at time-bin t into the past.

Accordingly, each $E_i[j](t)$ value for an element of a sketching matrix (312-1, 312-2, 312-3) may be used as a corresponding element in a PCA input matrix (315-1, 315-2, 315-3). Thus, the computed entropy values for each element in of the sketching matrices (312-1, 312-2, 312-3) become rows in the corresponding PCA input matrices (315-1, 315-2, 315-3). Once the PCA input matrices (315-1, 315-2, 315-3) reach a predetermined size (i.e., number of rows), they may be passed to a PCA engine (320-1, 320-2, 320-3) that identifies anomalous columns (325) in the input matrices (315-1, 315-2, 315-3) according to the techniques described in more detail above. Where k PCA input matrices (315-1, 315-2, 315-3) are used, the PCA may be computed over each of the matrices (315-1, 315-2, 315-3) independently, and a voting scheme may flag an anomaly if at least k'(<k) of the k matrices (315-1, 315-2, 315-3) fail the $Q_{statistic}$ statistic test mentioned above. Since each column in PCA input matrix Ai corresponds to a sketch entry in a sketching matrix comprised of sketching arrays (310-1, 310-2, 310-3), all the keys that hashed into this entry can be recovered from the pointer element of that particular element in the sketching array (310-1, 310-2, 310-3).

The intersection of elements that were present in all of the k' linked lists corresponding one-to-one with the pointer elements in the k' sketch entries identified as anomalous by the heuristic make up the culprit (key, value) elements from the original parameter array (301).

Once the cause of the anomaly has been determined, an automated anomaly response action may be initiated using practical widely-used protocols in the Internet. For example, to defeat forwarding path anomalies, routers support may access-control list rules of the type that can be provided with the anomalous signature definitions for matching/filtering.

In other examples, if a server machine that generates an anomalous signature is also part of a routing network (as a passive routing monitor device), all signatures can be injected into the interior gateway protocol (e.g., OSPF or IS-IS) using standards-based opaque link-state advertisements (LSAs), thereby allowing arbitrary information to be embedded into a standard OSPF LSA frame. Accordingly, any peer router may be able to install the signature into its ternary content addressable memory (TCAM) after receiving the information in an opaque LSA from its local interior gateway protocol (IGP) task, thereby blocking all anomalous/malicious flow patterns at the network edge before the anomaly can penetrate the network. Besides securing the local enterprise, all border routers that execute both BGP and OSPF will receive such LSA packets, allowing the signature patterns to be redistributed from the interior gateway protocol (OSPF) into the exterior protocol (BGP) task. The multi-protocol BGP may be extended to carry anomaly signatures as a part of routing updates that are exchanged by border routers across domains (autonomous systems). Such MP-BGP extensions may be backward-compatible with other implementations that do not contain the extensions, thereby lowering the adoption barrier that new protocols may face with regard to deployment. Using these extensions, the anomaly signatures may be transitively propagated through the network (for all BGP domains that support the extension) so that the attack may be blocked closest to the source of attack.

In other examples, a similar approach may be taken with routing protocol anomalies to install route-map rules in the control plane (rather than fast-path ACLs) of border-routers as intended.

While the process illustrated in FIG. 3 has been described with respect to Netflow elements, the process may also be applied to include control-plane troubleshooting for various layer-3 networking protocols (e.g., VRRP, PIM, OSPF, and BGP), layer-2 protocols (e.g., STP), and trunking and networking applications (e.g., DNS, DHCP, and SNTP), thereby serving as a robust foundation for cross-protocol network-wide troubleshooting in large-scale deployments.

Illustrative Methods

Figure 4:
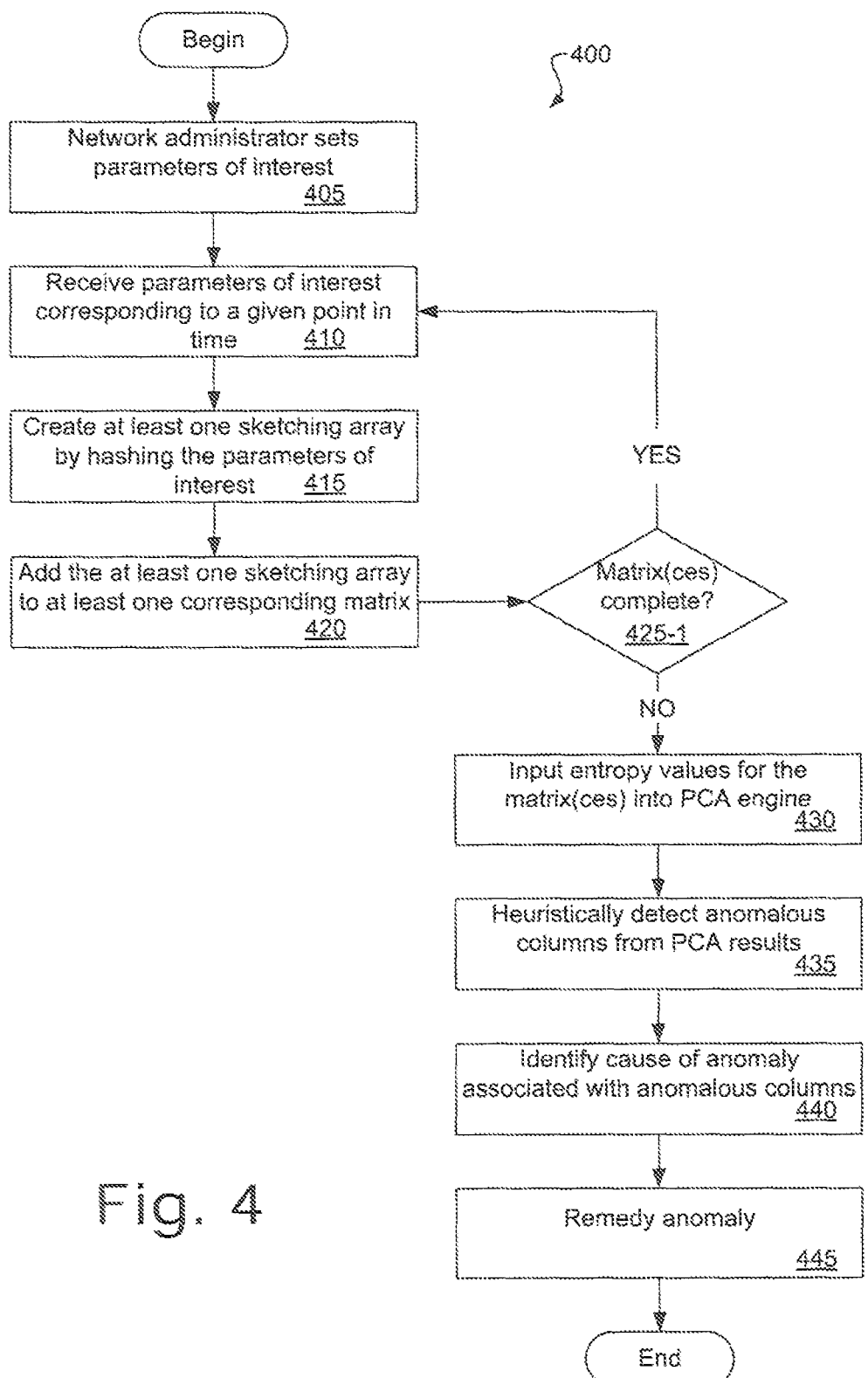
FIG. 4 is a flow diagram of an illustrative method of anomaly diagnosis in a core network according to one exemplary embodiment of the principles described herein.

Referring now to FIG. 4, a flow diagram is shown of an illustrative method (400) of detecting one or more anomalies in a network system. The method (400) begins when a network administrator sets (step 405) parameters of interest for monitoring in the network. These parameters interests are monitored and the parameters relating to one or more spatial points or devices are received (step 410) corresponding to a given time-bin. At least one sketching array is created (step 415) by hashing the parameters of interest for the given point in time to create a row of the hashed parameters corresponding to the time-bin.

The sketching array(s) are added (420) to at least one corresponding sketching matrix of a plurality of sketching arrays for different time-bins. If the sketching matrix has reached a predetermined size (decision 425), an entropy matrix corresponding to each sketching matrix will be input (step 430) into a PCA engine. Each entropy matrix includes a matrix of entropy calculations for each of the elements in its corresponding sketching matrix. The PCA engine heuristically detects (step 435) anomalous columns in each of the entropy matrices, and the cause of an anomaly may be identified (step 440) from a device associated with the anomalous columns. Finally, the anomaly may be autonomously remedied (step 445) as described above.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A method, comprising, with a network management device comprising a processor and memory, performing each of the following:
   creating a plurality of sketch matrices wherein each said sketch matrix corresponds to an individual hashing function and each row in said sketch matrix corresponds to an array of hashed parameters of interest from a plurality of network devices for a given period of time, said parameters of interest being configurable by an administrator;
   creating a principal components analysis (PCA) input matrix in at least one physical computer readable medium for each of said sketch matrices by computing an entropy value for each element in said sketch matrices;
   performing principal components analysis (PCA) on each of said PCA input matrices to heuristically detect a network anomaly in real time.

2. The method of claim 1, wherein each of said hashed parameters of interest further comprises a pointer to a corresponding unhashed parameter of interest.

3. The method of claim 2, wherein said performing principal components analysis on each of said PCA input matrices to heuristically detect a network anomaly in real time further comprises:
   identifying anomalous columns in said PCA input matrices; and
   identifying a cause of said network anomaly using said pointers to said corresponding unhashed parameters of interest in columns of said sketching matrices associated with said anomalous columns in said PCA input matrices.

4. The method of claim 1, further comprising automatically taking action to counteract said detected network anomaly.

5. The method of claim 4, wherein said action to counteract said detected network anomaly comprises:
   transmitting an anomalous signature to routers in said network by using an interior gateway protocol message of said network; and
   installing said anomalous signature into ternary content-addressable memory of said routers such that said routers are configured to filter network communications corresponding to said anomalous signature.

6. The method of claim 4, further comprising border routers in said network transmitting said anomalous signature to border routers outside of a domain of said network using an exterior protocol.

7. A network management device, comprising:
   a processor; and
   memory communicatively coupled to said processor; wherein said memory comprises computer-executable code embodied therewith, said computer-executable code being configured to cause said processor to implement:
   a parameter monitoring module configured to monitor parameters of interest set by a network administrator from a plurality of network devices communicatively coupled to said network management device;
   a sketching module configured to hash said monitored parameters of interest;
   a principal components analysis (PCA) engine module configured to perform principal components analysis on computed entropy values of said hashed monitored parameters of interest to detect a network anomaly in real time; and
   an anomaly resolution module configured to autonomously identify a source of said network anomaly and take action to mitigate said anomaly.

8. The network management device of claim 7, wherein said sketching module is configured to:
   create a plurality of sketch matrices wherein each said sketch matrix corresponds to an individual hashing function and each row in said sketch matrix corresponds to an array of said hashed parameters of interest for a given period of time; and create a principal components analysis (PCA) input matrix for each of said sketch matrices by computing an entropy value for each element in said sketch matrices.

9. The network management device of claim 8, wherein said PCA engine module is configured to perform said principal components analysis on said PCA input matrices.

10. The network management device of claim 7, wherein said computer-executable code is further configured to cause said processor to implement a user interface that allows said administrator to select the parameters of interest to be monitored.

11. The network management device of claim 7, wherein said anomaly resolution module is configured to:
    transmit an anomalous signature to routers in said network by using an interior gateway protocol message of said network; and
    cause said anomalous signature to be installed into ternary content-addressable memory of said routers such that said routers are configured to filter network communications corresponding to said anomalous signature.

12. The network management device of claim 7, wherein said anomaly resolution module is configured to cause border routers in said network to transmit said anomalous signature to border routers outside of a domain of said network using an exterior protocol.

13. A computer program product for identifying and mitigating network anomalies, said computer program product comprising:
    a non-transitory, computer usable medium having computer usable program code embodied therewith, said computer usable program code comprising:
        computer usable program code configured to cause a computer to create a plurality of sketch matrices wherein each said sketch matrix corresponds to an individual hashing function and each row in said sketch matrix corresponds to an array of hashed parameters of interest from a plurality of network devices for a given period of time, said parameters of interest being configurable by an administrator;
        computer usable program code configured to cause said computer to create a principal components analysis (PCA) input matrix for each of said sketch matrices by computing an entropy value for each element in said sketch matrices; and
        computer usable program code configured to cause said computer to perform principal components analysis (PCA) on each of said PCA input matrices to heuristically detect a network anomaly in real time.

14. The computer program product of claim 13, wherein said computer usable program code further comprises:
    computer usable program code configured to cause said computer to transmit an anomalous signature to routers in said network by using an interior gateway protocol message of said network; and
    computer usable program code configured to cause said computer to cause said anomalous signature to be installed into ternary content-addressable memory of said routers such that said routers are configured to filter network communications corresponding to said anomalous signature.

15. The computer program product of claim 13, wherein said computer usable program code further comprises:
    computer usable program code configured to cause said computer to cause border routers in said network to transmit said anomalous signature to border routers outside of a domain of said network using an exterior protocol.

16. The network management device of claim 7, further comprising said PCA engine module to identify an anomaly when a square prediction error exceeds a static threshold.

17. The network management device of claim 7, wherein each element of the hashed monitored parameters of interest comprises two components including a counter and a pointer, wherein said computed entropy values are computed from said counter component of the elements of the hashed monitored parameters of interest.

18. The network management device of claim 7, further comprising said sketching module to prepare said hashed monitored parameters of interest as PCA input matrices.

19. The network management device of claim 18, wherein, after a PCA input matrix reaches a predetermined size, that PCA input matrix is submitted to said PCA engine module.

20. The network management device of claim 7, further comprising said anomaly resolution module to install an anomaly signature corresponding to said anomaly on other network devices to mitigate said anomaly.

* * * * *